United States Patent [19]

Kramer et al.

[11] Patent Number: 4,555,407
[45] Date of Patent: Nov. 26, 1985

[54] CONTINUOUS CHEWING GUM METHOD

[75] Inventors: Franklin Kramer, Briarcliff Manor, N.Y.; Henderikus B. Bruins, Cream Ridge; Joseph Giacone, Princeton Junction, both of N.J.; Luc L. Carbillet, Buc, France

[73] Assignee: General Foods Corporation, White Plains, N.Y.

[21] Appl. No.: 686,049

[22] Filed: Dec. 24, 1984

[51] Int. Cl.$^4$ .............................................. A23G 3/30
[52] U.S. Cl. ........................................ 426/5; 426/512; 426/516; 426/517; 425/200; 425/376 R; 264/176 R; 156/204
[58] Field of Search ................. 426/5, 512, 3, 4, 6, 426/516, 517; 493/406, 254, 449; 425/200, 376 R; 156/204; 264/130, 176 R

[56] References Cited

U.S. PATENT DOCUMENTS

| | | | |
|---|---|---|---|
| 1,852,005 | 4/1932 | Garbutt | 426/5 |
| 2,156,810 | 5/1939 | Garbutt | 426/5 |
| 2,256,190 | 9/1941 | Bowman | 426/5 |
| 3,455,755 | 7/1969 | Phillips | 426/5 |
| 3,644,169 | 2/1972 | Phillips | 426/5 |

Primary Examiner—Jeanette Hunter
Attorney, Agent, or Firm—Joseph T. Harcarik; Thomas R. Savoie; Daniel J. Donovan

[57] ABSTRACT

A method for continuously forming wide, thin chewing gum slabs suitable for forming sheets and bands ready for packaging in an automatic wrapping machine is disclosed. The method involves compounding a chewing gum paste; extruding the formed gum paste as a wide thin slab through a die mounted on the discharge end of the extruder; cooling the extruded gum paste slab; and passing the gum paste slab through no more than two sets of calender rolls.

14 Claims, No Drawings

CONTINUOUS CHEWING GUM METHOD

TECHNICAL FIELD

The present invention relates to a method for continuously forming a wide, thin chewing gum slab which may be cut into sheets and scored into bands that are suitable for packaging in an automatic wrapping machine. More particularly, the invention involves continuously compounding a chewing gum paste preferrably with an average residence time of less than 2 minutes; extruding the formed gum paste as a slab at least 0.7 meters wide and less than 3 mm thick through a die mounted on the discharge end of an extruder; cooling the extruded gum paste slab to a temperature below about 60° C. in less than about 60 seconds; and passing the gum paste slab preferably through no more than two sets of calender rolls to further decrease the thickness of the gum paste slab to a final thickness.

BACKGROUND ART

In conventional chewing gum processes, a gum base and plasticizer are initially kneaded in baker type kneaders. Once the gum base has become a viscous melt, additional ingredients, such as sugar, rework, artificial colorings and the like are mixed into the melt. The mixing step usually involves first adding about one tenth of the total sugar and a starch hydrolyzate such as corn syrup and thoroughly mixing in those ingredients. Then, the remaining sugar is added and thoroughly mixed in. The flavoring is typically added last so that the flavoring is only mixed into the chewing gum paste for about one to three minutes. A typical processing rate is 2.5 metric tons per hour, requiring two one-ton capacity kneaders each operating on a 20 minute cycle.

Difficulties with this kneading and mixing operation are that it requires a complex intermitent timing control for ingredient addition, does not lend itself to feedback loop control, and tends to be labor intensive.

After the chewing gum paste has been thoroughly kneaded and mixed, the paste is held for about 30 minutes and then formed into a loaf by using either a chewing gum extruder pump and guillotine or a loaf forming machine which forms loaves by calendering and cutting. The loaves are typically ⅜" to 1½" thick, 1 to 1½ ft. wide and about 18 inches long. The temperature of the loaves after forming is about 55° C. The loaves are then cooled to about 48° C. to 52° C. If the temperature of the formed loaves is much above 55° C., the loaves, due to their thickness, cannot be cooled quickly enough which results in a detrimental change in the gum paste texture, and if kept at high temperatures too long affects crystal structure. Improper gum paste texture results in difficulty with further processing, and improper crystal structure results in a hard and brittle gum product.

After the loaves are cooled, they are transported to a forming extruder which consists of a nonintermeshing counter rotating twin screw pump with a rectangular orifice. The loaves are formed into slabs 13 to 25 mm thick and 16 to 18 inches wide. These thick gum paste slabs must be thinned into slabs the thickness of a stick of gum, typically 1.6 to 1.8 mm. Such thinning is accomplished by passing the slabs through a series of calender rolls. The speed of the slabs increase upon exiting each set of calender rolls, and the thinned slabs gain considerable speed (40 to 55 meters per minute) by the time they exit five sets of rolls. Typically, five sets of such calender rolls are used for an industrial unit operating at 2½ tons per hour. Maintaining precise dimensional control by using a number of calender rolls such as five sets of calender rolls has been found difficult and the multiple calendering is very sensitive to viscosity variations. Furthermore, coating material such as sugar must be applied to the slabs to prevent sticking. When multiple calender rolls are used, very large amounts of coating material are applied to the slabs before the first roller to carry through the remaining rollers. Since large amounts of coating material are used (12 to 15 weight percent based on the finished product), the excess coating material must be collected after calendering and recirculated requiring complex material handling equipment to minimize dust problems. Furthermore, the use of large amounts of coating material often results in excess coating materials on the gum pieces which affects the efficiency of subsequent packaging.

The speeding thinned gum paste slabs are then sliced into separate sheets containing scored bands which are suitable for feeding to an automatic wrapping machine. Because of the rapid speed of the thinned slabs, precise slicing is difficult resulting in varying dimensions and a significant amount of material (7 to 15 weight percent based on the final product) which must be refed to the system as rework. Each sheet is dimensioned to be as long as the width of about twenty-three to twenty-four sticks of gum and as wide as the length of about five or six sticks of gum. The individual sheets are scored into about five or six bands, each about as wide as twenty-three to twenty-four sticks of gum and as long as one stick of gum. The bands are removed by a takeaway conveyor and are stacked for feeding to the wrapping machine. The stacked bands are usually cured for about 16 to 24 hours at a temperature of about 20° C. One of the more widely used wrapping machines is the ACX-5 supplied by the Packaging Machinery Company of Springfield, Mass.

While the present system has performed satisfactorily, it has been desired to produce chewing gum which is less sensitive to product viscosity; has minimum material in the mixing operation resulting in better process response time, shorter flavor turnover time, and wider capacity operating range; lends itself to simplified process control; is compact; produces properly dimensioned product with textural consistency; reduces rework; and reduces the need for a complex sugar recirculation and dust collection system.

There have been attempts to address the desires of the industry. For example, U.S. Pat. No. 2,256,190 discloses an apparatus and method of handling chewing gum which utilizes a twin screw extruder for mixing a gum base material and extruding an elongated strand of material that is then rolled, calendered and cut. U.S. Pat. Nos. 1,852,005 and 1,953,295 disclose a twin auger mixing device wherein the ingredients are centered through a single opening and mixed by the twin screw auger in a steam jacket. The gum is extruded through a strip forming orifice. U.S. Pat. Nos. 3,455,755 and 3,644,169 disclose a method and apparatus for producing laminated slabs of chewing gum paste wherein a hot viscous melt is transferred from a holding pot to a sheeting nozzle which forms ribbons preferably ⅛" to ⅜" thick. The ribbon is then calendered and folded to form the laminated gum.

These efforts, however, have not been entirely satisfactory.

SUMMARY OF THE INVENTION

The method of the present invention involves compounding a chewing gum paste; extruding the gum paste as a slab at least 0.7 meters wide and less than 3 mm thick through a dye mounted on the discharge end of an extruder; cooling the extruded gum paste slab; passing the gum paste slab through preferably no more than two sets of calender rolls to form a wide, thin chewing gum slab. The slab may then be cooled and cut into sheets which are scored into bands. The sheets are suitable for packaging in an automatic wrapping machine.

It has been found that when this method is employed, the process is less sensitive to products viscosity; has minimum material in the mixing operation resulting in better process response time, shorter flavor and product turnover time, and wider operating range; is compact; produces properly dimensioned product with textural consistency; reduces rework; and eliminates the need for a complex coating material collection and recirculation system.

DETAILED DESCRIPTION OF THE INVENTION

The first step in the method of the present invention is to prepare a compound chewing gum paste. Preferably, the chewing gum paste is compounded in a twin screw extruder having an average residence time of less than two minutes and preferably less than one minute. The preferred method of compounding the chewing gum paste in the twin screw extruder comprises continuously introducing into a first feed port pelletized gum base, corn syrup, a first portion of granulated sugar plasticizer and coloring ingredients into the feed end of the twin screw extruder. A second portion of granulated sugar is continuously introduced into a second port at a point just past the first port along the length of the extruder from the feed end. Flavoring ingredients are preferably continuously introduced at a point at least about three-quarters from the length of the extruder from the feed end so as to minimize the amount of time the flavoring ingredients are exposed to the heat of the extruder.

The compounded gum paste is then continuously extruded from a die mounted on the discharge end of the extruder. Preferably the average residence is less than about two minutes. Having an average residence time of less than 2 minutes results in good process response time. Furthermore, flavor and product turnover time is reduced and wider operating ranges are permitted.

The gum paste compounded by the preferred continuous method consists of about 15% to 30% by weight pelletized or liquid gum base and from 5% to 15% by weight rework. The granulated sugar is from about 50% to 70% by weight of the gum paste. The formed gum paste is from about 12% to 20% by weight corn syrup and about 0.1% to 2% by weight plasticizer. The coloring and flavoring ingredients are added in effective amounts, typically consisting of less than about 1% of the weight of the formed gum paste. Small amounts of water, e.g. less 0.1% of the weight of the formed gum paste, may also be added. Other gum paste compositions such as sugarless compositions containing dipeptide sweeteners may be used.

The formed gum paste is extruded through a die mounted on the discharge end of an extruder. The die is configured so that the extruded slab is at least 0.7 meters wide and preferably 1 meter wide or more and the extruded slab is less than 3.0 mm thick and preferably less than 2.5 mm thick. Furthermore, the temperature of the slab exiting the extruder must be less than 100° C. and preferably less than 75° C. While any die which can produce such a slab may be used, it is most preferable to use a coat hanger type dye on the end of the extruder. Such coat hanger type dyes, so named because of the hanger shaped groove cut into the base of the die, are well-known and widely used in the polymer industry. The hanger shaped groove is dimensioned so as to provide an even pressure drop across the width of the die which conveniently permits the extrusion of a wide, thin slab. One such coat hanger die is described in U.S. Pat. No. 4,285,685, for example. Coat hanger dies are preferred for the method of the present invention because such dies are capable of reliably providing the desired slab width, thickness, uniformity, and temperature.

The extruded gum paste slab is then cooled, preferably continuously, to a temperature less than 60° C. in less than 60 seconds and preferably in less than 30 seconds. It is desirable to cool the extruded gum paste slab to less than 60° C. in less than about 60 seconds so as to prevent sugar recrystallization and to minimize flavor loss. When slabs thicker than 3.0 mm are cooled at this rate, the cooling results in adverse textural qualities. The cooling is most typically carried out on a metal conveyor belt which is cooled underneath. Alternative methods of cooling the extruded gum paste slab may be used, such as blowing cool air on the surface of the slab with fans, provided that the methods in fact cool the slab in less than about 60 seconds.

The cooled extruded gum paste slab is then passed through calender rolls so as to decrease and adjust the thickness of the gum paste slab. Preferably no more than two sets of such calender rolls are used and more preferably one set of calender rolls is used. The use of only one or two sets of calender rolls provides more precise dimensional control and also permits operating the method of the present invention at higher throughput rates than would otherwise be the case. Furthermore, since the calender rolls result in relatively small reductions in slab thickness the amount of coating material such as sugar or calcium carbonate added to the slab surface prior to calendering are reduced. This results in little if any recirculation of the coating materials which minimizes dust problems. Also the coating is more uniform which minimizes coating variation from gum piece stick to stick. This results in better packaging efficiency.

The ability of the die, most preferably a coat hanger die, to provide a gum paste slab at least 0.7 meters wide and less than 3.0 mm thick and preferably 2.5 mm, is one of the unique aspects of the present invention which permits only two sets of calender rolls to be used. As hereinbefore noted, conventional gum processes typically provide for the extrusion of thick slab which must be passed through a multiplicity of sets of calender rolls to arrive at a slab with a thickness of the conventional stick of gum. Such a multiplicity of calender rolls entails the difficulties of dimensional control slower operationg speeds and sensitivity to product viscosity previously discussed.

Once the extruded gum paste slab has been placed through the calender rolls, the slab is preferably cooled to about 18° C. to 25° C. and preferably about 21° C. and then sliced, preferably continuously, into sheets and bands. Because of the wide width of the extruded slab each width of slab will form at least two sheets and preferably four sheets. For a given capacity, more than one sheet per slab width results in a slower linear velocity of the sheets allowing for more precise cutting and less rework. The sheets are most preferably dimensioned to be as long as about the width of twenty-four sticks of gum and as wide as the length of about six sticks of gum. However, the sheets may only be as wide as the length of a single stick of gum or may be as wide as the length of 24 sticks of gum or more. The individual sheets are scored into bands. The scoring of the bands is formed by slicing mostly but not all the way through the thickness of the sheet so that the bands are easily broken off prior to the automatic wrapping machine. Each band is about as long as twenty-three to twenty-four sticks of gum and as wide as about one stick of gum. The sheets and bands so produced are removed by a take-away conveyor and then stacked. The take-away conveyor is a rate limiting step since changing of direction occurs. In the present invention, multiple sheets per slab width are employed allowing for multiple take-away conveyors and greater throughput.

The bands are then ready for feeding to an automatic wrapping machine. One of the more typical automatic wrapping machines is the ACX-5, supplied by the Packaging Machinery Company as herein before described.

The following examples are intended to illustrate certain embodiments of the present invention. The examples are not meant to limit the invention beyond what is claimed below.

EXAMPLE 1

In this example a chewing gum paste was formed by adding 671 lb/hr sugar; 162 lb/hr corn syrup; 197 lb/hr gum base; 55 lb/hr. rework; 7.0 lb/hr plasticizer; 7.1 lb/hr color and flavor; and 0.7 lb/hr water (1099.8 lb/hr total) to a twin screw extruder. The extruder employed was a Model No. ZE90A extruder available from the Berstorff Corporation, Hanover, Germany. The extruder was 94 mm in diameter and employed mostly low shear transport-type elements with one high sheet mixing element between the upstream inlet port and a downstream inlet port. The sugar was added in equal amounts to the upstream and downstream inlet ports and the remaining ingredients were added to the upstream inlet port. The extruder was water cooled. The average residence time through the extruder was one and a half minutes.

The gum paste was then extruded through a five zone electrically heated coat hanger die, model Ultraflex R 75, available from Extrusion Dies Incorporated of Chippewa Falls, Wis. to form a gum slab. The die was mounted on the end of the extruder. The gum paste slab exiting the extruder was about 65° C. to about 75° C. The pressure just before the die was low e.g., 18–22 atmospheres. The slab exiting the die was 2.0±0.1 mm thick and 1 meter wide. The slab was then cooled to below 50° C. in less than 25 seconds and to about 38°–40° C. in less than 75 seconds. The slab was air cooled employing a stainless steel belt about 1 meter wide and 4 meters long traveling at a rate of 3.4 meter/min.

The cooled gum slab was coated with about 1% sugar based on slab weight and then passed through a water cooled highly polished Berstoff calender 1 meter wide and about 350 mm in diameter to form a thinned gum slab 1 meter wide and 1.68±0.05 mm thick. The thinned gum slab was then passed through a cutting and scoring roll. The roll made three continuous cuts in the thinned slab. Two cuts occurred at each edge of the thinned slab and one cut occurred in the center line of the thinned slab resulting in two slabs each one sheet wide. Between the center line cut and each edge cut, 5 parallel equally spaced scoring cuts were made. Each equally spaced scoring cut was the width of a band.

The cut and scored slabs were then passed through a second cutting roll which made cuts across the entire width of the slab forming two sheets 460 mm long and 0.438 meter wide. Each sheet contained six bands held together at the score cuts.

The gum material cut away from the thinned slab at the edges was collected for recycle.

The separate sheets were then cooled to 20° C. in less than one minute using a stainless steel cooling belt with tap water spraying under the cooling belt. The separate sheets were then collected and were ready for feeding to an automatic wrapping machine.

EXAMPLE 2

This example was substantially the same as Example 1 except that the throughput rate was increased by about 40%, the temperature of the gum paste slab exiting the extruder was about 70° C. to about 75° C., and the pressure just before the die was 15 to 21 atmospheres. Suitable product was obtained.

What is claimed is:

1. A method for continuously forming a wide thin chewing gum slab suitable for forming sheets and bands ready for packaging in an automatic wrapping machine which comprises:
   (a) continuously compounding a chewing gum paste;
   (b) extruding the formed gum paste to a slab at least 0.7 meters wide and less than 3 mm thick, said extruded slab having a temperature less than 100° C.;
   (c) cooling the extruded gum paste slab to a temperature less than about 60° C. in less than about 60 seconds; and
   (d) passing the gum paste slab through calender rolls to reduce the slab to less than 2.5 mm thick.

2. A method according to claim 1 wherein the continuous compounding of the chewing gum paste has an average residence time of less than 2 minutes.

3. A method according to claim 1 wherein the gum paste slab is passed through no more than two sets of calender rolls.

4. A method as in claim 1 wherein the gum paste comprises:
   (a) about 15 wt% to about 30 wt% liquid or pelletized gum base;
   (b) about 50 wt% to about 70 wt% sugar;
   (c) about 5 wt% to about 15 wt% rework;
   (d) about 12 wt% to about 20 wt% corn syrup; and
   (e) about 0.1 wt% to about 2 wt% plasticizer.

5. A method according to claim 1 wherein the gum paste is compound in a twin screw extruder.

6. A method according to claim 1 wherein the gum paste is extruded to a slab one meter or greater wide and less than 2.5 mm thick.

7. A method according to claim 1 wherein the compounded gum paste is extruded through a coat hanger die.

8. A method according to claim 1 wherein the extruded slab is less than 75° C.

9. A method according to claim 1 wherein the extruded slab is further cooled to less than 50° C. in less than 30 seconds.

10. A method according to claim 1 wherein the cooled slab is passed through one set of calender rolls.

11. A method for continuously forming gum sheets ready for packaging in an automatic wrapper machine which comprises:
 (a) continuously compounding a chewing gum paste with an average residence time of less than 2 minutes;
 (b) extruding the compounding gum paste to a slab at least 0.7 meters wide and less than 3 mm thick, said extruded slab having a temperature less than 100° C.;
 (c) cooling the extruded gum paste to a temperature less than 50° C. in less than 60 seconds;
 (d) passing the gum paste slab through no more than two sets of calender rolls to reduce the slab to less than 2.5 mm thick;
 (e) slicing the slab into sheets;
 (f) scoring the sheets to form bands; and
 (g) cooling the slab to from about 18° C. to about 25° C.

12. A method according to claim 11 which further comprises applying a coating material to the extruded slab prior to passing the slabs through a calender roll.

13. A method according to claim 12 wherein the coating material is applied in an amount from about 0.20 weight % to about 1.0 Wt% based on the slab weight.

14. A method according to claim 11 wherein the sheets contain six bands.

* * * * *